(12) United States Patent
Puig

(10) Patent No.: US 8,340,840 B2
(45) Date of Patent: Dec. 25, 2012

(54) METHOD AND DEVICE FOR REDUCING ON AN AIRCRAFT LATERAL EFFECTS OF A TURBULENCE

(75) Inventor: Stéphane Puig, Lauzerville (FR)

(73) Assignee: Airbus Operations (SAS), Toulouse Cedex (FR)

( * ) Notice: Subject to any disclaimer, the term of this patent is extended or adjusted under 35 U.S.C. 154(b) by 377 days.

(21) Appl. No.: 12/847,748

(22) Filed: Jul. 30, 2010

(65) Prior Publication Data
US 2011/0029159 A1    Feb. 3, 2011

(30) Foreign Application Priority Data
Aug. 3, 2009    (FR) ....................... 09 03820

(51) Int. Cl.
*B64C 13/16*    (2006.01)
*G05D 1/08*    (2006.01)
*G06F 19/00*    (2006.01)
(52) U.S. Cl. ................ 701/3; 701/10; 701/11; 244/76 C
(58) Field of Classification Search .................. 701/7, 3, 701/4, 10, 11; 244/76 C, 177, 194, 195; 340/968
See application file for complete search history.

(56) References Cited

U.S. PATENT DOCUMENTS

| | | | |
|---|---|---|---|
| 3,007,656 A | 11/1961 | Miller et al. | |
| 4,094,479 A | 6/1978 | Kennedy, Jr. | |
| 4,891,642 A * | 1/1990 | Muller | 340/968 |
| 5,375,794 A * | 12/1994 | Bleeg | 244/76 C |
| 5,669,582 A | 9/1997 | Bryant et al. | |
| 6,095,459 A | 8/2000 | Codina | |
| 6,751,532 B2 * | 6/2004 | Inokuchi | 701/14 |
| 7,757,993 B1 * | 7/2010 | Hahn | 244/195 |
| 2008/0251648 A1 | 10/2008 | Colomer et al. | |

OTHER PUBLICATIONS

Cohen, et al., "Use of Active Control Technology to Improve Ride Qualitites of Large Transport Aircraft," Agard Conf. Proc., Oct. 14, 1975, pp. 1-17.
Goslin, et al., "An Optimized Yaw Damper for Enhanced Passenger Ride Comfort," Boeing Company, Jun. 1, 1987, pp. 395-396.

* cited by examiner

Primary Examiner — Tan Q Nguyen
(74) Attorney, Agent, or Firm — Novak Druce + Quigg LLP

(57) ABSTRACT

A method and device for reducing on an aircraft lateral effects of a turbulence. The device (1) includes means (2, 3, 5, 7, A1, A2) for calculating and applying a roll control command and a yaw control command enabling the side effects generated by a turbulence event to be attenuated on the aircraft.

9 Claims, 2 Drawing Sheets

METHOD AND DEVICE FOR REDUCING ON AN AIRCRAFT LATERAL EFFECTS OF A TURBULENCE

CROSS-REFERENCE TO RELATED APPLICATIONS

This application claims priority to French Patent Application 0903820, filed Aug. 3, 2009, the entire contents of which are incorporated herein by reference.

FIELD OF THE INVENTION

The present invention relates to a method and a device for attenuating on an aircraft, in particular a transport airplane, the side effects generated by at least one turbulence event undergone by this aircraft upon flight. The side effects that the present invention offers to deal with relate to roll moment disturbances, which may provide discomfort for pilots and passengers, and in the most extreme cases, negatively act on the aircraft security.

BACKGROUND OF THE INVENTION

It is known that upon a flight, the violent turbulence related to vertical wind gusts, can cause at the aircraft:
large vertical acceleration variations which, when negative, are likely to injure aircraft passengers;
a large deviation of the aircraft in altitude, which increases the collision risk with another aircraft;
lift peaks on the airfoil, which test the maximum load rating thereof; and
roll moments, as well as lateral accelerations, which are also likely to injure aircraft passengers.

Two atmospheric turbulence types are generally responsible for the troubles caused to an aircraft, that is:
clear air turbulence events, of the CAT ("Clear Air Turbulence") type, which represent wind shears which often occur without being perceptibly visible, generally above 15,000 feet (about 4,500 meters). Such clear air turbulence events which are of the non-convective type, most often occur near the tropopause, rather above the mountains and rather in winter. These turbulence events represent a natural risk upon a flight and can bring about injuries for the passengers under some particularly harsh conditions. Moreover, such turbulence events bring about a further fuel consumption (for avoiding the turbulence area) and contribute to the fatigue of the aircraft and pilots; and
convective turbulence events which often are visible through clouds being present. The harsh convective turbulence events occur in rather humid regions, such that a radar can generally detect them. Thus, most of the time, this phenomenon can be avoided by aircrafts. However, pilots may be surprised or may not have time to bypass an area of convective turbulence events. The harshest turbulence events occur in storm clouds, with current ascents and downdroughts that can reach several tens of meters per second. These convective turbulence events are quite localised and less expanded than clear air turbulence events.

Often, the previous phenomena which are localised surprise both the aircraft crew and the piloting systems on board, that do not have time to carry out the operations suitable for attenuating effects thereof, in particular the side ones, which occur at the aircraft level.

From patent applications FR-0510341 and WO-2007/042652, it is known a device for attenuating on an aircraft the effects of a vertical turbulence event undergone by this aircraft upon a flight.

The object of the present invention is to attenuate exclusively the side effects generated by a turbulence event. However, it is not limited to the above-mentioned atmospheric turbulence events, but can also relate to wake turbulence events which, by definition, are likely to occur in an aircraft wake, accordingly at any altitude. Indeed, the cause of such wake turbulence events is not due to atmospheric phenomena, but to the presence of an aircraft ahead the aircraft undergoing the turbulence event.

On the other hand, it is known:
from U.S. Pat. No. 3,007,656 an automatic pilot which is used to stabilise an aircraft with respect to its primary axes, in particular upon a turbulence event. This prior document provides accelerometers for measuring accelerations along each of these axes and means for calculating roll, pitch and yaw control commands intended to compensate for such accelerations, these control commands being applied to that end to usual control surfaces of the aircraft; and
from U.S. Pat. No. 6,095,459, a system for counteracting asymmetrical aerodynamic forces that may be generated on a multiengine aircraft, in particular in case of an engine breakdown of said aircraft. To this end, this prior document provides means for counteracting an undesirable yaw and roll, by maintaining a zero sideslip angle.

SUMMARY OF THE INVENTION

The present invention relates to a method for automatically attenuating on an aircraft, in particular a transport airplane, the side effects generated by at least one turbulence event undergone by this aircraft upon a flight.

To that end, according to the invention, said method according to which it is carried out upon a flight of the aircraft, automatically and iteratively, the following consecutive steps consisting of:
a) estimating a roll moment of the aircraft, which is due to wind and a yaw moment of the aircraft, which is also due to wind;
b) measuring the current values of the aircraft;
c) calculating, through said estimated roll moment, said estimated yaw moment and said measured current values:
a roll control command for at least one first controllable movable member which is likely to act on the roll of the aircraft, said roll control command being such that, as applied to said first movable member, it enables the roll disturbances due to wind to be minimised on the aircraft; and
a yaw control command for at least one second controllable movable member which is likely to act on the yaw of the aircraft; and
d) applying:
said roll control command to said first movable member; and
said yaw control command to said second movable member,
is remarkable in that at step c):
said roll and yaw control commands are calculated using a same mathematical expression; and
said yaw control command is calculated so that, when applied to said second movable member, said yaw control command enables both the side effects generated by the turbulence event and side effects generated by applying said roll control command to said first movable member to be compensated for on the aircraft.

Thus, by virtue of the invention, the roll moment disturbances, as well as the side effects, generated by a turbulence event on the aircraft, are minimised. This in particular enables to improve the comfort for the pilot and the passengers of the aircraft, and to cause a potential reduction of the number of injured people, when the aircraft undergoes turbulence events.

The present invention is applicable to any type of turbulence events which generate side effects onto the aircraft, namely both atmospheric and wake turbulence events.

On the other hand, it is to be noticed that the above-mentioned U.S. Pat. No. 3,007,656 and U.S. Pat. No. 6,095,459 do not disclose, in particular, the simultaneous calculation of the yaw control command and the roll control command, with the aim to anticipate and compendate for the side effects generated by applying this roll control command (which is intended to minimise the roll disturbances due to wind). Thanks to this key characteristic, the yaw control command in accordance with the present invention has a dual function: reducing the side effects generated by the turbulence event and compensating for the side effects which will be caused by the corrective roll control.

Moreover, advantageously, a sideslip value of the aircraft is also calculated, and this sideslip value thus calculated is used, at step a), for assessing the roll and yaw moments.

In this case, preferably, for calculating said sideslip value $\beta$:
a value $\beta 1$ illustrating the derivative with respect to sideslip time is calculated using the following expression:

$$\beta l = Ay + rl \cdot \Delta x + g \cdot \cos\theta \cdot \sin\phi - r \cdot \cos\alpha + p \cdot \sin\alpha$$

wherein:
Ay is the lateral acceleration;
$\Delta x$ is the longitudinal distance between accelerometers used for measuring the lateral acceleration and the centre of gravity of the aircraft;
r is the yaw rate and rl is the derivative with respect to time of r;
$\phi$ is the roll angle;
$\alpha$ is the incidence angle; and
$\theta$ is the trim; and
this value $\beta 1$ is integrated so as to obtain said sideslip value $\beta$.

Further, a filter can be applied to remove low frequencies and high frequencies.

This mathematical determination of sideslip value $\beta$ does not need a particular probe to know the sideslip of the aircraft.

On the other hand, for estimating said roll moment $\Delta Clw$ due to wind at step a), in a preferred embodiment:
a global roll moment DCl is determined through the following expression:

$$DCl = \Delta L / (\rho \cdot V^2 \cdot S \cdot co/2)$$

wherein:
$\Delta L$ is a coefficient which is calculated from measured values of parameters of the aircraft;
$\rho$ is the density of air;
V is the air speed of the aircraft;
S is the airfoil area of the aircraft; and
co represents the mean aerodynamic chord of the aircraft; and
said roll moment $\Delta Clw$ (due to wind) is calculated using the following expression:

$$\Delta Clw = DCl - Cl\delta l \cdot \delta l - Cl\delta r \cdot \delta r - Cl\beta \cdot \beta - Clp \cdot p \cdot co/V - Clr \cdot r \cdot co/V$$

wherein:
$Cl\delta l, Cl\delta r, Cl\beta, Clp$ and $Clr$ are predetermined coefficients;
$\delta l$ is a roll control command;
$\delta r$ is a yaw control command;
$\beta$ is a sideslip value;
p and r are roll and yaw rates;
co thus represents the mean aerodynamic chord of the aircraft; and
V thus represents the air speed of the aircraft.

Moreover, at step a), for estimating said yaw moment $\Delta Cnw$ due to wind, in a preferred embodiment:
a global yaw moment DCn is determined, using the following expression:

$$DCn = \Delta N / (\rho \cdot V^2 \cdot S \cdot co/2)$$

wherein:
$\Delta N$ is a coefficient which is calculated from measured values of parameters of aircraft (A);
$\rho$ is the density of air;
V is the air speed of aircraft (A);
S is the airfoil area of aircraft (A); and
co represents the mean aerodynamic chord of aircraft (A); and
said yaw moment $\Delta Cnw$ is calculated using the following expression:

$$\Delta Cnw = DCn - Cn\delta r \cdot \delta r - Cn\beta 19 \, \beta - Cnr \cdot r \cdot co/V$$

wherein:
$Cn\delta r, Cn\beta$ and $Cnr$ are predetermined coefficients;
$\delta r$ is a yaw control command;
$\beta$ is a sideslip value;
r is the yaw rate.

Moreover, advantageously, at step c), said roll control command $\delta l$ and said yaw control command $\delta r$ are calculated using the following mathematical expression:

$$\begin{bmatrix} \delta l \\ \delta r \end{bmatrix} = \begin{pmatrix} Cl\delta l & Cl\delta r \\ Cn\delta l & Cn\delta r \end{pmatrix}^{-1} \begin{bmatrix} \Delta Clw \\ \Delta Cnw \end{bmatrix}$$

wherein:
$Cl\delta r$ and $Cn\delta r$ are roll moment coefficients;
$Cn\delta l$ and $Cn\delta r$ are yaw moment coefficients;
$\Delta Clw$ is said roll moment due to wind; and
$\Delta Cnw$ is said yaw moment due to wind.

In a preferred embodiment, said roll control command thus calculated is applied to a plurality of first movable members, in particular a plurality of spoilers and/or ailerons.

Moreover, in a particular embodiment, advantageously:
at a step prior to step d):
at least one characteristic parameter relative to roll and/or yaw (which varies depending on the presence of a turbulence event and possibly of its severity) is determined; and
this characteristic parameter is compared to a predetermined threshold value; and
at step d), said roll and yaw control commands are applied, only if said characteristic parameter is higher than said threshold value.

Thus, by virtue of this particular embodiment, a monitoring of side turbulence events is carried out, which act on said characteristic parameter relative to the roll and/or yaw, and it is carried out an attenuation of side effects generated unto the aircraft, only if lateral turbulence events are detected, in the course of this monitoring, that is when said characteristic parameter exceeds said threshold value.

The present invention also relates to a device for attenuating on an aircraft, in particular a transport airplane, the side effects generated by at least one turbulence event undergone by this aircraft upon a flight.

According to the invention, said device is of the type including:
- means for estimating a roll moment of the aircraft, which is due to wind, as well as a yaw moment of the aircraft, which is also due to wind;
- means for measuring the current values of parameters of the aircraft;
- means for calculating, using said estimated roll and yaw moments and said measured current values:
  - a roll control command for at least one first controllable movable member which is likely to act on the aircraft roll, said roll control command being such that, when applied to said first movable member, it enables the roll disturbances due to wind to be minimised on the aircraft; and
  - a yaw control command for at least one second controllable movable member which is likely to act on the aircraft yaw; and
- means for applying:
  - said roll control command to said first movable member; and
  - said yaw control command to said second movable member, is remarkable in that said means for calculating said roll and yaw control commands are formed so as to:
- calculate said roll and yaw control commands using a same mathematical expression; and
- calculate said yaw control command such that, when applied to said second movable member, said yaw control command enables both the side effects generated by the turbulence and side effects generated by applying said roll control command to said first movable member to be compensated for on the aircraft.

The present invention also relates to an aircraft system which includes:
- at least one first controllable movable member (but preferably a plurality of first controllable movable members), for example an aileron or a spoiler, which is likely to act on the roll of the aircraft;
- at least one second controllable movable member, for example a fin, which is likely to act on the yaw of the aircraft; and
- a device such as the above-mentioned one, for attenuating on the aircraft the side effects generated by at least one turbulence event undergone by this aircraft upon a flight, by determining control commands and applying them to said first and second movable members.

Moreover, the present invention also relates to an aircraft which is provided with a device such as the above-mentioned and/or with an aircraft system such as the above-mentioned.

BRIEF DESCRIPTION OF THE DRAWINGS

The figures of the appended drawing will help better understand how the invention can be embodied. In these figures, identical references denote similar elements.

DETAILED DESCRIPTION

Figure 1:
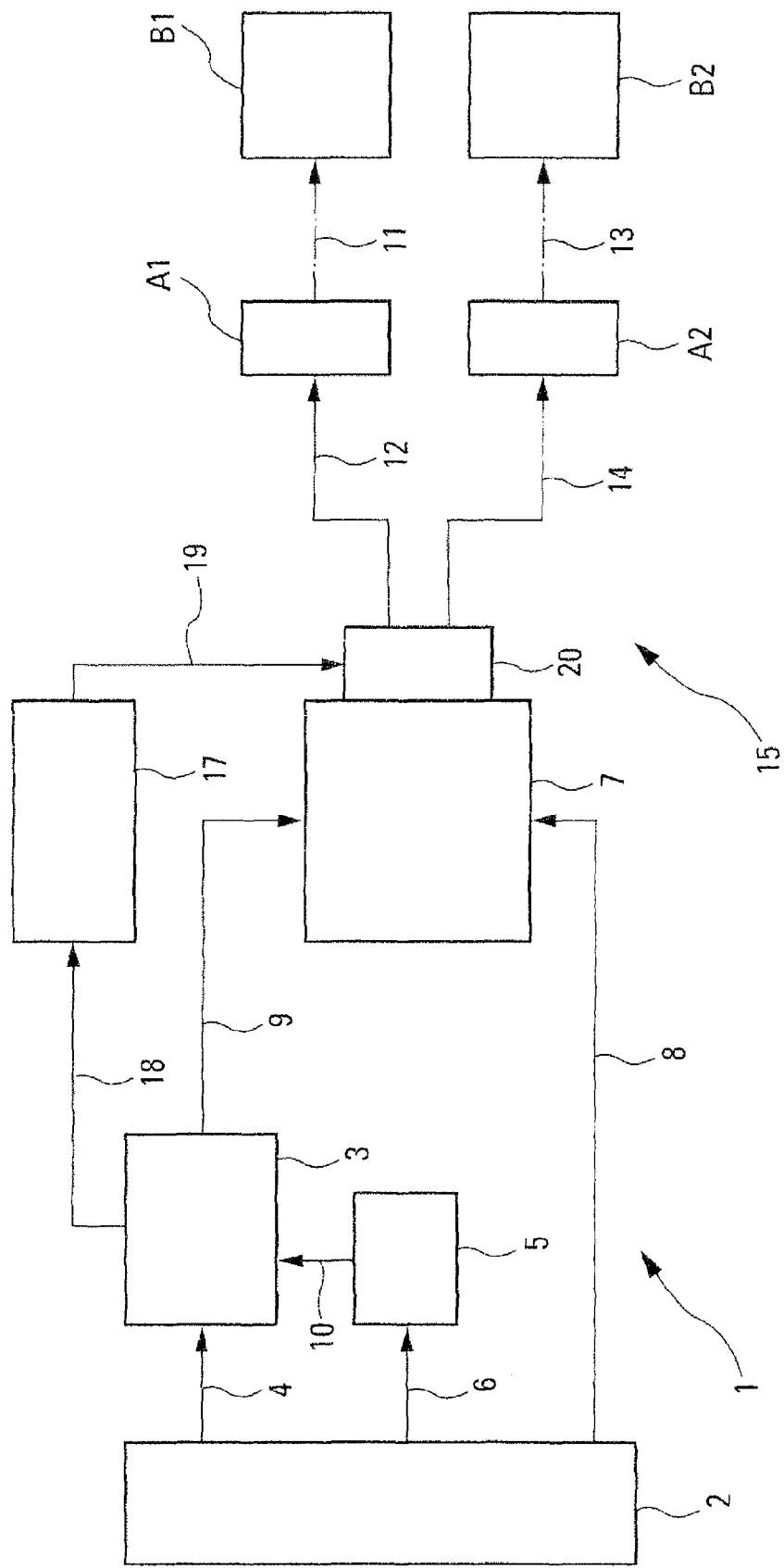
FIG. 1 is the block diagram of a device in accordance with the invention.

The device 1 in accordance with the invention and schematically represented in FIG. 1 is adapted to be mounted on an aircraft A, for example a transport airplane, for attenuating the side effects generated by at least one turbulence event undergone by this aircraft A upon a flight.

It is known that a turbulence event corresponds to air agitation which is superposed with the mean air motion and which is made up of disordered motions, continuously transforming. A turbulence event occurs inside or in the vicinity of clouds (for example in a storm cloud where vertical currents with opposite directions coexist). There are also clear air turbulence events, either close to the soil, either at a very high altitude in the vicinity of jet currents.

According to the invention, said device 1 includes:
- a set 2 of information sources, which include usual means for measuring (or calculating) the current values of parameters of aircraft A, set out below, upon a flight;
- means 3 which are connected through a link 4 to said set 2 of information sources and which are formed so as to estimate, on the one hand, a roll moment of aircraft A, which is due to wind (that is a turbulence event) undergone by the aircraft upon a flight, and on the other hand, a yaw moment of aircraft A which is also due to wind;
- means 5 which are connected through a link 6 to said set 2 of information sources and which are formed so as to determine a sideslip value and to transmit it to said means 3 via a link 10;
- a calculation unit 7 which is connected through links 8 and 9 respectively to said set 2 and said means 3 and which is formed so as to calculate, using roll and yaw moments estimated by means 3 and current values measured by set 2, using a same mathematical expression (1) set out below:
  - a roll control command for at least one first controllable movable member (or control surface) set out below, which is likely to act on the roll of aircraft A. This roll control command is such that, when applied to said first movable member, it enables the roll disturbances due to wind to be minimised on aircraft A; and
  - a yaw control command for at least one second controllable movable member (or control surface) set out below, which is likely to act on the yaw of aircraft A. This yaw control command is such that, when applied to said second movable member, it enables the side effects, that is both the side effects generated by the turbulence event and the side effects generated by applying said roll control command to said first movable member, to be compensated for on the aircraft;
- a set A1 of actuating means which are likely to actuate, that is move, as illustrated by a link 11 in chain dotted lines, at least one first movable member being a part of (a) a set B1 of a first movable member(s). Said set B1 can include one or more first movable members, preferably spoilers 20 and/or ailerons 21 of aircraft A. Said set A1 receives said roll control command through a link 12 of said calculation unit 7, and its actuating means move the first movable member(s) of said set B1, usually, in accordance with said roll control command; and
- a set A2 of actuating means which are likely to actuate, that is move, as illustrated by a link 13 in chain dotted lines, at least one second movable member being a part of a set B2 of (a) a second movable member(s). Said set B2 can include one or more second movable members. It includes, preferably, a fin 22. Said set A2 receives said yaw control command through a link 14 of said calculation unit 7, and its actuating means move the second movable member(s) of said set B2, usually, in accordance with said roll control command.

In a particular embodiment, said device 1 is part, as well as said sets B1 and B2, of a system 15 which is on board aircraft A. The processings (measurements, calculations, command applications, . . . ) implemented by said device 1 are carried out in real time.

Moreover, in a preferred embodiment, said device 1 is formed so as to apply said roll control command to a plurality of first movable members, in particular to a plurality of spoilers 20 and/or ailerons 21.

The device 1 in accordance with the invention is thus formed so as to minimise the roll moment disturbances, as well as the side effects, generated by a turbulence event on aircraft A. This in particular enables to improve the comfort for the pilot and passengers of aircraft A, and to result in a potential reduction of the number of injured people, when aircraft A undergoes turbulence events.

It will be noticed that the yaw control command which is applied to the second movable member enables both the side effects generated by the turbulence event and the side effects generated by applying said roll control command to said first movable member to be compensated for. Accordingly, it has a dual function: reducing the effects of turbulence events and compensating for the effects caused by the roll control.

Said device 1 is applicable to any type of turbulence events which generate side effects onto the aircraft, that is both atmospheric and wake turbulence events.

Moreover, said means 5 calculate a sideslip value $\beta$, which is then used by means 3 for estimating the roll and yaw moments of aircraft A.

In a preferred embodiment, said means 5 include the following integrated elements, for calculating said sideslip value $\beta$:

an element for calculating a value $\beta 1$ illustrating the derivative with respect to sideslip time. To that end, this element uses the following expression representing the lateral force equation:

$$\beta 1 = Ay + rl \cdot \Delta x + g \cdot \cos\theta \cdot \sin\phi - r \cdot \cos\alpha + p \cdot \sin\alpha$$

wherein:
$\phi$ is the roll angle of aircraft A;
cos and sin are respectively cosine and sine;
Ay is the lateral acceleration of aircraft A;
$\Delta x$ is the longitudinal distance between accelerometers used for measuring the lateral acceleration and the centre of gravity of aircraft A;
r is the yaw rate of aircraft A;
rl is the derivative with respect to time of r;
g is the gravity acceleration;
$\alpha$ is the incidence angle of aircraft A; and
$\theta$ is the trim of aircraft A; and
an element for integrating this value $\beta 1$, usually, with respect to time, so as to obtain said sideslip value $\beta$.

The means 5 can further include a filter for removing low frequencies and high frequencies.

This mathematical determination of sideslip value $\beta$ does not need a particular probe to know the sideslip of aircraft A.

In a preferred embodiment, said means 3 which are intended to estimate the roll moment $\Delta$Clw due to wind, include the following (integrated and not represented) elements:

a first element for determining inertias of aircraft A, as a function of its mass and its centring (which are usually determined by means being part of said set 2) as well as tabulated data;

a second element for determining a global roll moment DCl, using the following expression:

$$DCl = \Delta L / (\rho \cdot V^2 \cdot S \cdot co/2)$$

wherein:
$\Delta L$ is a coefficient set out below, which is calculated from measured values of parameters of aircraft A and inertias determined by said first element;
$\rho$ is the density of air;
V is the air speed of aircraft A;
S is the airfoil area of aircraft A; and
co represents the mean aerodynamic chord of aircraft A; and a third element for calculating said roll moment $\Delta$Clw using the following expression:

$$\Delta Clw = DCl - Cl\delta l \cdot \delta l - Cl\delta r \cdot \delta r - Cl\beta \cdot \beta - Clp \cdot p \cdot co/V - Clr \cdot r \cdot co/V$$

wherein:
$Cl\delta l$, $Cl\delta r$, $Cl\beta$, $Clp$ and $Clr$ are predetermined coefficients;
$\delta l$ is a roll control command;
$\delta r$ is a yaw control command;
$\beta$ is a sideslip value; and
p and r are roll and yaw rates.

Figure 2:
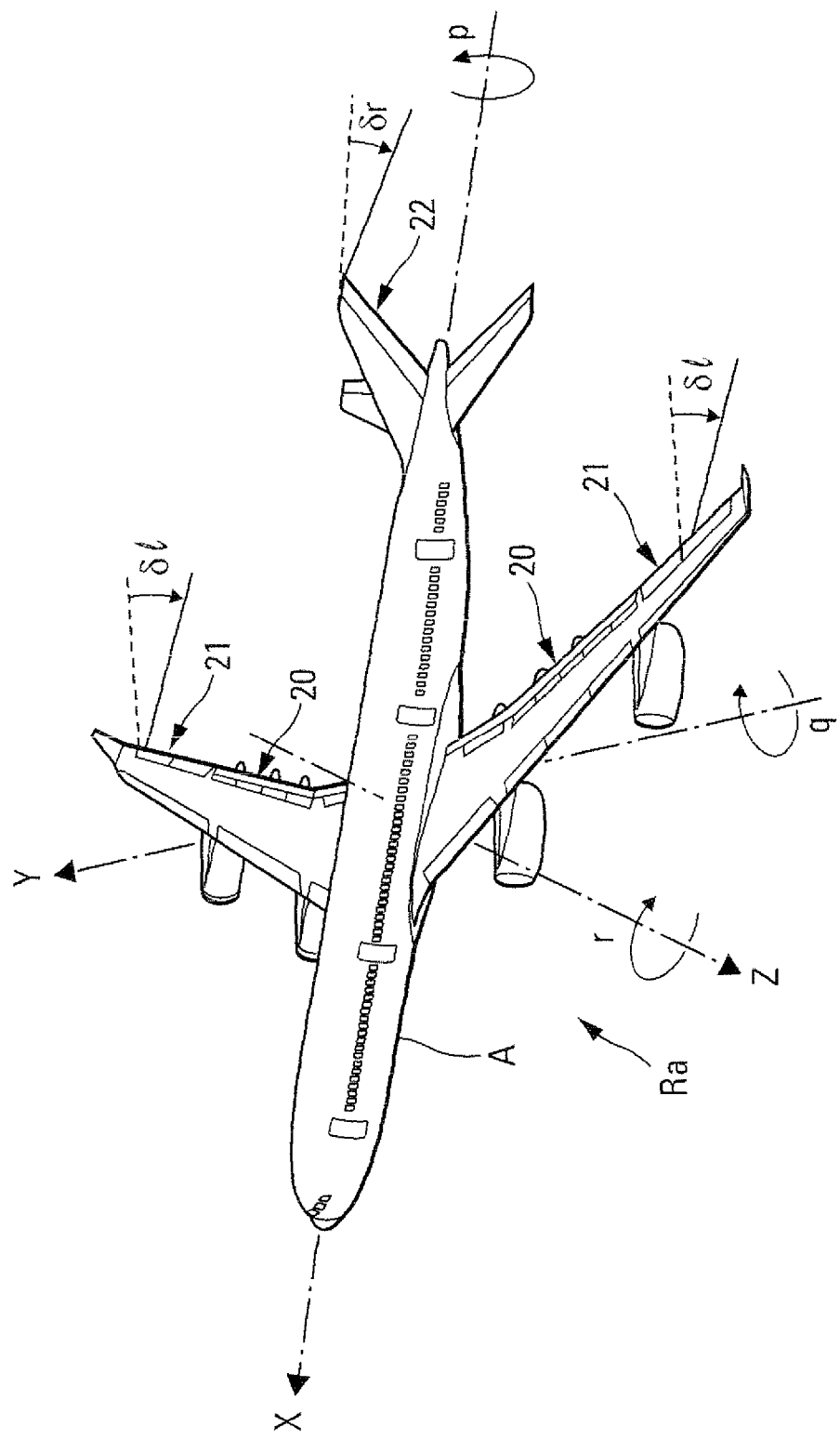
FIG. 2 is a diagram showing an aircraft on which are represented the different motion axes.

To that end, it will be noticed that from the moment equations for an aircraft A being in roll, the roll moment can be defined as follows:

p, q, r are the angular rates (roll, pitch and yaw respectively) about the axes X, Y, Z of aircraft A, as represented in FIG. 2. These angular rates are measured with usual rate gyros being part of set 2. These axes X, Y, Z are the axes of a reference Ra related to aircraft A. More precisely:
X is defined along the longitudinal axis of aircraft A;
Y is orthogonal to the axis X and passes through the mean plan of the wings of aircraft A; and
Z is perpendicular to the plane XY formed by axes X and Y and passes at the centre of gravity of aircraft A;
Ix, Iy, Iz and Ixz refer to the inertias along the axes X, Y, Z and along the plane XZ of aircraft A, respectively, which are usually calculated;
$L = pl \cdot Ix - Ixz \cdot (p \cdot q + rl) - q \cdot r \cdot (Iy - Iz)$ is obtained, pl and rl being the derivatives with respect to time of p and r;
for small disturbances, the following assumption can be made:

$$\Delta L = pl \cdot Ix - rl \cdot Ixz$$

the global roll moment can be inferred as a function of $\rho$ (density of air), S (airfoil area), co (mean aerodynamic chord), and V (air speed of aircraft A), using the following expression:

$$DCl = \Delta L / (\rho \cdot V^2 \cdot S \cdot co/2);$$

when the aircraft A is operating, the flight control loops or the operations are likely, through the control surfaces, to create roll moments too. Since the flight controls are responsive to wind, the differential to be counteracted will be determined. Therefore, the aim is to infer from the global roll moment DCl, the roll moments due to the control surfaces of aircraft A which are already in motion (function of parameters such as Mach number and aerodynamic configuration); and the roll moment due to wind $\Delta$Clw thus obtained has not yet be counteracted and it should be counteracted by the flight controls and the control surfaces.

On the other hand, said means 3 which are also intended to estimate the yaw moment $\Delta$Cnw due to wind, also include the following (integrated and not represented) elements:

an element for determining the inertias of aircraft A, as a function of its mass and its centring (which are usually determined by means being part of said set 2), as well as tabulated data;

an element for determining a global yaw moment DCn, using the following expression:

$$DCn = \Delta N/(\rho \cdot V^2 \cdot S \cdot co/2)$$

wherein:
ΔN is a coefficient set out below, which is calculated from measured values of parameters of aircraft A and inertias determined by the previous element;
ρ is the density of air;
V is the air speed of aircraft A;
S is the airfoil area of aircraft A; and
co represents the mean aerodynamic chord of aircraft A; and
an element for calculating said roll moment ΔCnw using the following expression:

$$\Delta Cnw = DCn - Cn\delta r \cdot \delta r - Cn\beta \cdot \beta - Cnr \cdot r \cdot co/V$$

wherein:
Cnδr, Cnβ, Cnr are predetermined coefficients;
δr is a yaw control command;
β is a sideslip value; and
r is the yaw rate.
To that end, it will be noticed that from the moment equations for an aircraft A being in yaw, the yaw moment can be defined as follows:
p, q, r are the angular rates (roll, pitch and yaw respectively) about the axes X, Y, Z of aircraft A, as represented in FIG. 2. These angular rates are measured with usual rate gyros being part of set 2. These axes X, Y, Z are the axes of a reference Ra related to aircraft A. More precisely:
X is defined along the longitudinal axis of aircraft A;
Y is orthogonal to the axis X and passes through the mean plan of the wings of aircraft A; and
Z is perpendicular to the plane XY formed by axes X and Y and passes at the centre of gravity of aircraft A;
Ix, Iy, Iz and Ixz refer to the inertias along the axes X, Y, Z and along the plane XZ of aircraft A, respectively, which are usually calculated;
N=r1·Iz−Ixz·(p1−q·r)+p·q·(Ix−Iy) is obtained, p1 and r1 being the derivatives with respect to time of p and r;
for small disturbances, the following assumption can be made:

$$\Delta N = r1 \cdot Iz - p1 \cdot Ixz$$

the global yaw moment can be inferred as a function of ρ (density of air), S (airfoil area), co (mean aerodynamic chord), and V (air speed of aircraft A), using the following expression:

$$DCn = \Delta N/(\rho \cdot V^2 \cdot S \cdot co/2);$$

when aircraft A is operating, the flight control loops or the operations are likely, through the control surfaces, to create yaw moments too. Since the flight controls are responsive to wind, the differential to be counteracted will be determined. Therefore, the aim is to infer from the global roll moment DCn, the yaw moments due to control surfaces of aircraft A which are already in motion (function of parameters such as Mach number and aerodynamic configuration); and
the yaw moment due to wind ΔCnw thus obtained has not yet been counteracted and it should be counteracted by the flight controls and the control surfaces.
Moreover, said calculation unit 7 calculates said roll control command δl and said yaw control command δr, using the following mathematical expression (1):

$$\begin{bmatrix} \delta l \\ \delta r \end{bmatrix} = \begin{pmatrix} Cl\delta l & Cl\delta r \\ Cn\delta l & Cn\delta r \end{pmatrix}^{-1} \begin{bmatrix} \Delta Clw \\ \Delta Cnw \end{bmatrix}$$

wherein:
Clδl and Clδr are roll moment coefficients;
Cnδl and Cnδr are yaw moment coefficients;
ΔClw is said roll moment due to wind; and
ΔCnw is said yaw moment due to wind.
The calculation method of the commands δl and δr before-mentioned is set out below.
When the function is activated, specific commands are sent to surfaces dedicated to the roll (such as spoilers 20 and ailerons 21) and to the yaw (fin 22). The aim here is to artificially create a roll moment opposite to the roll moment due to wind, so as to minimise the roll undergone by aircraft A. The spiral stability of aircraft A is thus artificially changed.
From the estimation of roll and yaw moments due to wind, the aim is to find a couple of commands in roll moment 61 (with preferably the ailerons 21) and in yaw moment δr (with the fin 22) so as to counteract the moments due to wind.
The aerodynamic moments generated by the control surfaces of aircraft A are written as follows:

$$\begin{bmatrix} Cl\delta \\ Cn\delta \end{bmatrix} = \begin{pmatrix} Cl\delta l & Cl\delta r \\ Cn\delta l & Cn\delta r \end{pmatrix} \begin{bmatrix} \delta l \\ \delta r \end{bmatrix}$$

If the moments due to wind desired to be minimised are introduced:

$$\begin{pmatrix} Cl\delta l & Cl\delta r \\ Cn\delta l & Cn\delta r \end{pmatrix} \begin{bmatrix} \delta l \\ \delta r \end{bmatrix} = \begin{bmatrix} \Delta Clw \\ \Delta Cnw \end{bmatrix}$$

is obtained.
If the latter equation is reversed, the mathematical expression (1) before-mentioned is obtained:

$$\begin{bmatrix} \delta l \\ \delta r \end{bmatrix} = \begin{pmatrix} Cl\delta l & Cl\delta r \\ Cn\delta l & Cn\delta r \end{pmatrix}^{-1} \begin{bmatrix} \Delta Clw \\ \Delta Cnw \end{bmatrix}.$$

The coefficients falling in the calculation made by the calculation unit 7 are therefore the following ones:
the roll moment coefficient due to a roll command Clδl;
the roll moment coefficient due to a yaw command Clδr;
the roll moment coefficient due to wind ΔClw;
the yaw moment coefficient due to a roll command Cnδl;
the yaw moment coefficient due to a yaw command Cnδr; and
the yaw moment coefficient due to wind ΔCnw.
The yaw moment coefficient due to the roll moment due to wind is judged to be negligible.
A filter can be added onto the commands, as well as a gain being a function of the movable members (or control surfaces) used. A filter may enable to filter high frequencies that are not physically accessible through the movable members used. It also enables the structure of aircraft A not to be excited. It can also provide a phase lead to counteract the activation delay, the delay on estimating the roll moment and the delay generated by the systems for calculating the algorithm. The aim is to obtain that the physical effect of wind onto aircraft A and the physical effect generated by the movable members be in phase so as to similarly counteract the disturbance.

Moreover, as indicated above, the roll command δl may, for example, be converted into commands for the ailerons 21 and/or the spoilers 20, and the yaw command δr is converted, preferably, into command for the fin 22.

On the other hand, in a particular embodiment, said device 1 further includes activation means 17 which are connected through a link 18 to said means 3 and which check whether activation conditions are satisfied. These activation means 17 are also connected through a link 19 to an emitting means 20A associated to said calculation unit 7. This emitting means 20A sends the control commands determined by the calculation unit 7 to said sets A1 and A2 only when the activation means 17 indicate that the activation conditions are met and allow this sending.

In a particular embodiment, said activation means 17:
determine at least one characteristic parameter relative to the roll and/or yaw (which varies as a function of the presence of a turbulence event, and if any, of its severity); and
compare this characteristic parameter to a predetermined threshold value.

In this case, the device 1 applies said roll and yaw control commands, only if said characteristic parameter is higher than said threshold value. Preferably, this threshold value is set such that the function is activated from moderate turbulence events.

Said characteristic parameter can be a roll rate due to wind. In this case, from a roll coefficient due to roll rate Clp, the roll rate pv due to wind can be determined using the following expression:

$$pv = \Delta Clw \cdot V/Clp \cdot co$$

It is also possible to use, as the characteristic parameter, a yaw rate, a roll moment or a yaw moment. A roll rate is however easier to manage than a roll moment.

When the activation of the turbulence event is cancelled, all the commands are gradually cancelled, and the movable members 20, 21, 22 used gradually come back to a neutral position.

The invention claimed is:

1. A method for attenuating on an aircraft (A) the side effects generated by at least one turbulence event undergone by this aircraft (A) upon a flight, method according to which, upon a flight of aircraft (A), automatically and iteratively, comprising:
a) estimating a roll moment of aircraft (A), which is due to wind and a yaw moment of the aircraft (A), which is also due to wind;
b) measuring the current values of aircraft (A);
c) using said estimated roll moment, said yaw moment and said measured current values, calculating:
a roll control command for at least one first controllable movable member (20, 21) which is likely to act on the roll of aircraft (A), said roll control command being such that, as applied to said first movable member (20, 21), it enables the roll disturbances due to wind to be minimised on aircraft (A); and
a yaw control command for at least one second controllable movable member (22) which is likely to act on the yaw of aircraft (A); and
d) applying:
said roll control command to said first movable member (20, 21); and
said yaw control command to said second movable member (22),
a method according to which, further at step c):
said roll control command δl and said yaw control command δr are calculated, using the following mathematical expression:

$$\begin{bmatrix} \delta l \\ \delta r \end{bmatrix} = \begin{pmatrix} Cl\delta l & Cl\delta r \\ Cn\delta l & Cn\delta r \end{pmatrix}^{-1} \begin{bmatrix} \Delta Clw \\ \Delta Cnw \end{bmatrix}$$

wherein:
Clδl and Clδr are roll moment coefficients;
Cnδl and Cnδr are yaw moment coefficients;
ΔClw is said roll moment due to wind; and
ΔCnw is said yaw moment due to wind; and
said yaw control command is calculated so that, when applied to said second movable member (22), said yaw control command enables both the side effects generated by the turbulence event and the side effects generated by applying said roll control command to said first movable member (20, 21) to be compensated for on aircraft (A).

2. The method according to claim 1, wherein calculating a sideslip value of the aircraft, and then using this sideslip value thus calculated, at step a), for estimating roll and yaw moments.

3. The method according to claim 2, wherein, for calculating said sideslip value β:
a value β1 illustrating the derivative with respect to sideslip time is calculated using the following expression:

$$\beta 1 = Ay + rl \cdot \Delta y + rl \cdot \Delta x + g \cdot \cos\theta \cdot \sin\phi - \cos\alpha + p \cdot \sin\alpha$$

wherein:
Ay is the lateral acceleration;
Δx is the longitudinal distance between accelerometers used for measuring the lateral acceleration and the centre of gravity of aircraft (A);
r is the yaw rate and rl is the derivative with respect to time of r;
φ is the roll angle;
α is the incidence angle; and
θ is the trim; and
this value β1 is integrated so as to obtain said sideslip value β.

4. The method according to claim 1, wherein at step a), for estimating said roll moment ΔClw due to wind:
a global roll moment DCl is determined, using the following expression:

$$DCl = \Delta L/(\rho \cdot V^2 \cdot S \cdot co/2)$$

wherein:
ΔL, is a coefficient which is calculated from measured values of parameters of aircraft (A);
ρ is the density of air;
V is the air speed of aircraft (A);
S is the airfoil area of aircraft (A); and
co represents the mean aerodynamic chord of aircraft (A); and
said roll moment ΔClw is calculated using the following expression:

$$\Delta Clw = DCl - Cl\delta l \cdot \delta l - Cl\delta r \cdot \delta r - Cl\beta \cdot \beta - Cl\beta \cdot \beta - Clp \cdot p \cdot co/V - Clr \cdot r \cdot co/V$$

wherein:
Clδl, Clδr, Clβ, Clp and Clr are predetermined coefficients;

δl is a roll control command;
δr is a yaw control command;
β is a sideslip value; and
p and r are roll and yaw rates.

5. The method according to claim 1, wherein at step a), for estimating said yaw moment ΔCnw due to wind:
a global yaw moment DCn is determined using the following expression:

$$DCn = \Delta N/(\rho \cdot V^2 \cdot S \cdot co/2)$$

wherein:
ΔN is a coefficient which is calculated from measured values of parameters of aircraft (A);
ρ is the density of air;
V is the air speed of aircraft (A);
S is the airfoil area of aircraft (A); and
co represents the mean aerodynamic chord of aircraft (A); and
said roll moment ΔCnw is calculated using the following expression:

$$\Delta Cnw = DCn - Cn\delta r \cdot \delta r - Cn\beta \cdot \beta - Cnr \cdot r \cdot co/V$$

wherein:
Cnδr, Cnβ and Cnr are predetermined coefficients;
δr is a yaw control command;
β is a sideslip value; and
r is the yaw rate.

6. The method according to claim 1, wherein:
at a step prior to step d):
at least one characteristic parameter relative to the roll and/or yaw is determined; and
this characteristic parameter is compared to a threshold value; and
at step d), said roll and yaw control commands are applied, only if said characteristic parameter is higher than said threshold value.

7. A device for attenuating on an aircraft (A) the side effects generated by at least one turbulence event undergone by this aircraft (A) upon a flight, said device (1) comprising:
means (3) for estimating a roll moment of aircraft, which is due to wind, as well as a yaw moment of the aircraft, which is also due to wind;
means (2) for measuring the current values of parameters of aircraft (A);
means (7) for calculating, using said estimated roll and yaw moments and said measured current values:
a roll control command for at least one first controllable movable member (20, 21) which is likely to act on the roll of aircraft (A), said roll control command being such that, when applied to said first movable member (20, 21), it enables the roll disturbances due to wind to be minimised on aircraft (A); and
a yaw control command for at least one second controllable movable member (22) which is likely to act on the yaw of aircraft (A); and
means (A1, A2) for applying:
said roll control command to said first movable member (20, 21); and
said yaw control command to said second movable member (22),
said means (7) for calculating the roll and yaw control commands being formed so as to:
calculate said roll control command δl and said yaw control command δr, using the following mathematical expression:

$$\begin{bmatrix} \delta l \\ \delta r \end{bmatrix} = \begin{pmatrix} Cl\delta l & Cl\delta r \\ Cn\delta l & Cn\delta r \end{pmatrix}^{-1} \begin{bmatrix} \Delta Clw \\ \Delta Cnw \end{bmatrix}$$

wherein:
Clδl and Cnδr are roll moment coefficients;
Cnδl and Cnδr are yaw moment coefficients;
ΔClw is said roll moment due to wind; and
ΔCnw is said yaw moment due to wind; and
calculate said yaw control command such that, when applied to said second movable member (22), said yaw control command enables both the side effects generated by the turbulence event and side effects generated by applying said roll control command to said first movable member (20, 21) to be compensated for on aircraft (A).

8. An aircraft system, wherein:
at least one first controllable movable member (20, 21) which is likely to act on the roll of aircraft (A);
at least one second controllable movable member (22) which is likely to act on the yaw of aircraft (A); and
a device (1) such as that specified in claim 7, for attenuating on aircraft (A) the side effects generated by at least one turbulence event undergone by this aircraft (A) upon a flight, by determining control commands and applying them to said first and second movable members (20, 21, 22).

9. An aircraft, comprising a device (1) such as the one specified in claim 7.

* * * * *